US012773582B2

(12) United States Patent
Mendez-Chavez

(10) Patent No.: US 12,773,582 B2
(45) Date of Patent: Oct. 27, 2026

(54) CONNECTOR FOR A GAS MASK FIT TEST ADAPTER

(71) Applicant: Government of the United States, as represented by the Secretary of the Air Force, Wright-Patterson AFB, OH (US)

(72) Inventor: Hector Mendez-Chavez, Dededo, GU (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 710 days.

(21) Appl. No.: 18/210,025

(22) Filed: Jun. 14, 2023

(65) Prior Publication Data

US 2024/0416156 A1 Dec. 19, 2024

(51) Int. Cl.
*A62B 18/08* (2006.01)
*F16B 7/04* (2006.01)

(52) U.S. Cl.
CPC .......... *A62B 18/086* (2013.01); *F16B 7/0406* (2013.01)

(58) Field of Classification Search
CPC ........ A62B 18/086; A45F 3/166; A42B 3/048
See application file for complete search history.

(56) References Cited

U.S. PATENT DOCUMENTS 6,641,177 B1 * 11/2003 Pinciaro .............. F16L 37/0985 285/257
7,594,426 B1 * 9/2009 Gruenfelder ........ G01M 3/2876 73/40

OTHER PUBLICATIONS

Wagner, Eric, M50 Fit Testing—Drinking Tube Adapter Quick-Fix, published on the internet on Jun. 7, 2011 at https://www.youtube.com/watch?v=tfjlnunkXEg.

* cited by examiner

*Primary Examiner* — Margaret M Luarca
(74) *Attorney, Agent, or Firm* — AFMCLO/JAZ; Jeffrey V. Bamber

(57) ABSTRACT

A connector for temporarily fastening a drinking tube to one end of a fit test adapter for a gas mask is disclosed. The connector includes a first component and a second component that fits inside the first component. The first component has a first end, a second end, and side walls extending between the first and second ends. The first end of the first component has an end wall with an opening therein. The second end of the first component is at least partially open. The inside surface of the side walls of the first component has a shelf thereon adjacent the second end. The shorter side walls of the second component terminate at the bottom end of the second component, and are sized and configured for resting on the shelf adjacent the second end of the first component.

5 Claims, 8 Drawing Sheets

CONNECTOR FOR A GAS MASK FIT TEST ADAPTER

RIGHTS OF THE GOVERNMENT

The invention described herein may be manufactured and used by or for the Government of the United States for all governmental purposes without the payment of any royalty.

FIELD OF THE INVENTION

The present invention relates generally to connectors and, more particularly, to a connector for a gas mask fit test adapter.

BACKGROUND OF THE INVENTION

Military members are required to wear Mission Oriented Protective Posture (MOPP) equipment while deployed in an environment where attacks of a chemical, biological, radiological, or nuclear (CBRN) nature are likely. Military members, law enforcement, and first responders may wear an M50 series protective (gas) mask such as that manufactured by Avon Protection Systems, Inc. of Cadillac, Michigan.

Avon Protection Systems manufactures a sampling fit test adapter for drinking tubes used with its M50 masks. This fit test adapter has a clip that connects a drinking tube to the fit test adapter. These clips, however, frequently break or come loose during fit testing, which causes the M50 masks to fail the fit test.

Therefore, a need exists for improved connector to use with the current gas mask fit test adapter when the adapter has a broken clip.

SUMMARY OF THE INVENTION

The present invention relates generally to connectors and, more particularly, to a connector for a gas mask fit test adapter.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a connector is disclosed. The connector comprises a first outer component and a second inner component that is sized and configured for fitting into one end of the first component.

The first outer component has a longitudinal axis, a first end, a second end, a length and side walls extending between the first end and the second end. The side walls have an inside surface and an outside surface. The first end of the first component comprises an end wall that has an opening therein. The second end of the first component is at least partially open, and the inside surface of the side walls has a shelf thereon adjacent the second end.

The second inner component is sized and configured for fitting into the second end of the first component. The second component has a first (or "inner") end, a second (or "outer") end, a top surface at the inner end and shorter side walls (or "legs") extending between said the inner end and the outer end. The shorter side walls terminate at the outer end and are sized and configured for resting on the shelf adjacent the second end of the first component.

A method of temporarily fastening a drinking tube to one end of a fit test adapter for a gas mask is also provided. The fit test adapter has a drinking tube end for attaching a drinking tube of a gas mask, an opposing end for inserting another tube, and a wider portion that defines a waist between the drinking tube end and the opposing end. The method may comprise the steps of:

a) attaching a drinking tube to the drinking tube end of the fit test adapter for a gas mask, wherein the drinking tube has a cap portion that fits onto the drinking tube end of the fit test adapter;

b) providing a connector as described above comprising a first component and a second component;

c) placing the first component over the cap portion of the drinking tube that is attached to the fit test adapter so that the end wall of the first component fits against the cap portion of the drinking tube and the drinking tube extends outward from the opening in the end wall, and the second end of the first component extends toward the opposing end of the fit test adapter; and d) placing the second component over the opposing end of the fit test adapter and inserting the top end of the second component into the second end of the first component until the ends of the legs of the second component rest on the shelf on the inside surface of the first component.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to connectors and, more particularly, to a connector for a gas mask fit test adapter.

Figure 1:
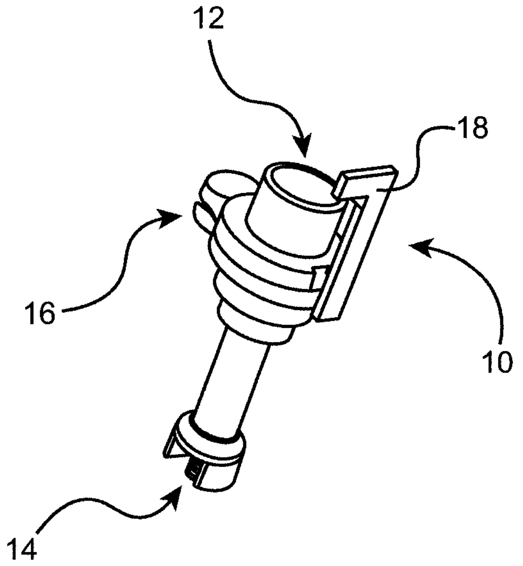
FIG. 1 (PRIOR ART)
FIG. 1 is a perspective view of a current M50 gas mask fit test adapter for drinking tubes.

FIG. 1 shows a current M50 gas mask fit test adapter 10 for drinking tubes. This fit test adapter 10 has a first drinking tube end 12, a second opposing end 14, a wider portion 16 that defines a waist between the drinking tube end 12 and the opposing end 14, and a clip 18 that connects a drinking tube to the fit test adapter 10. A PVC tube is inserted into the opposing end 14 that is used to measure the particulates inside of the mask versus outside of the mask. The clip 18, however, frequently breaks as shown in FIG. 2, or comes loose during fit testing, both of which problems may cause the M50 masks to fail the fit test.

Figure 2:
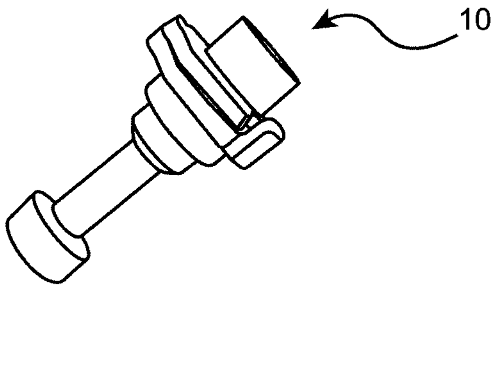
FIG. 2 (PRIOR ART)
FIG. 2 is a perspective view of the M50 gas mask fit test adapter with a broken clip.
Figure 3:
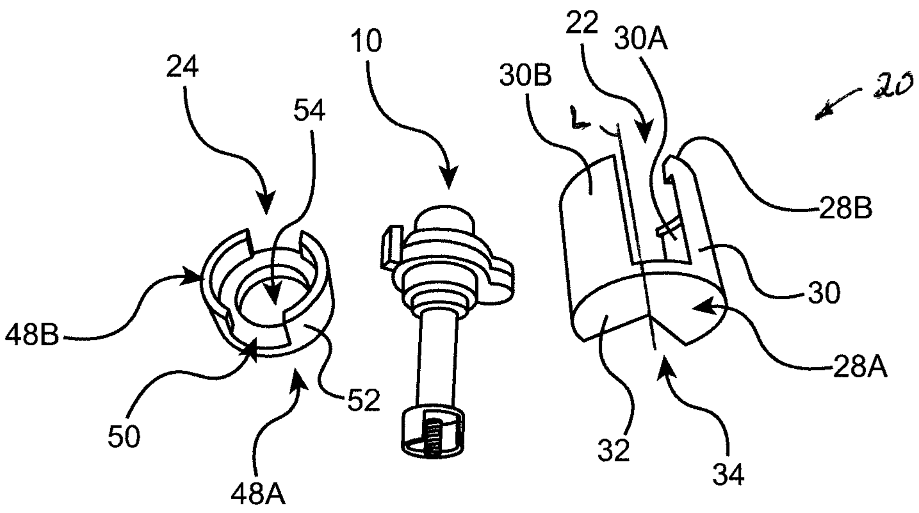
FIG. 3 is a perspective view of the M50 gas mask fit test adapter shown in FIG. 2 with the two components of the present connector.

FIG. 3 is a perspective view of the M50 gas mask fit test adapter 10 shown in FIG. 2 with the two components of the present connector 20. The connector 20 comprises a first outer component 22 and a second inner component 24 that is sized and configured for fitting into one end of the first component 22.

Figure 4:
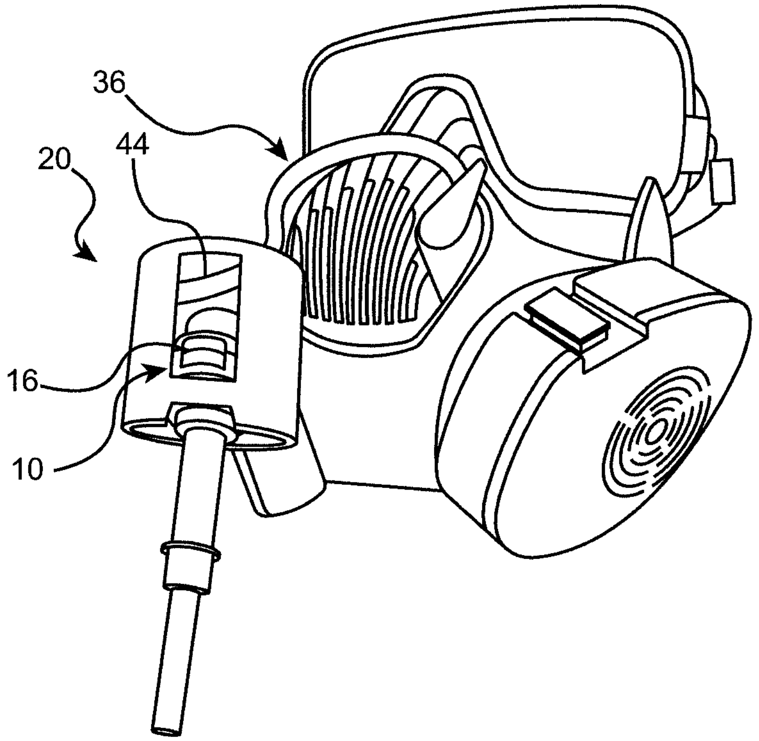
FIG. 4 is a perspective view of the M50 gas mask with the present connector shown from one side fastened to the fit test adapter.
Figure 5:
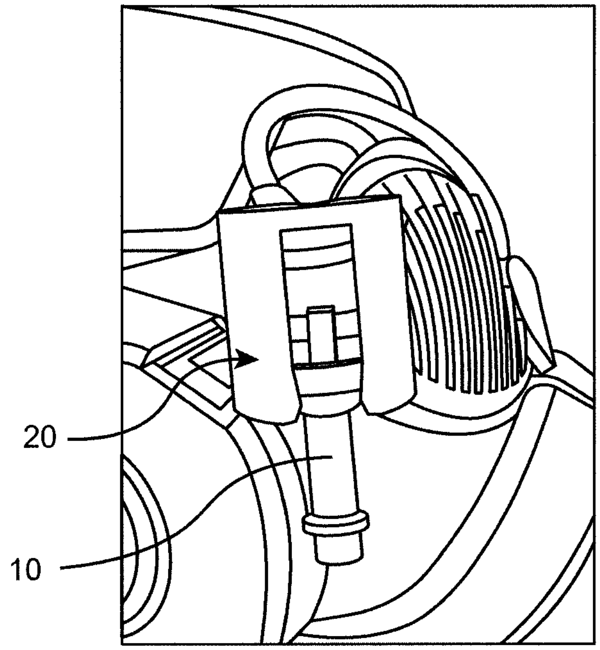
FIG. 5 is a perspective view of the M50 gas mask with the present connector shown from the opposite side fastened to the fit test adapter.
Figure 6:
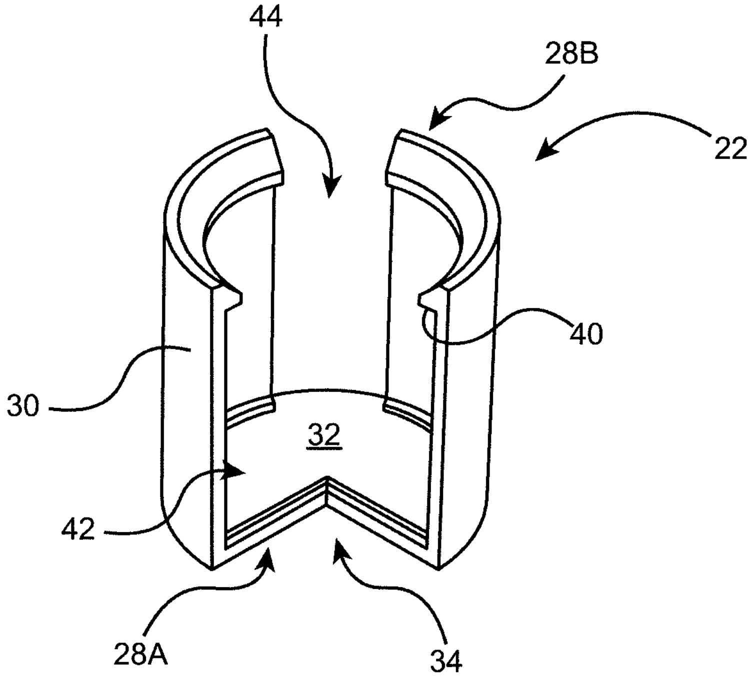
FIG. 6 is a perspective top view of the first component of the connector.
Figure 7:
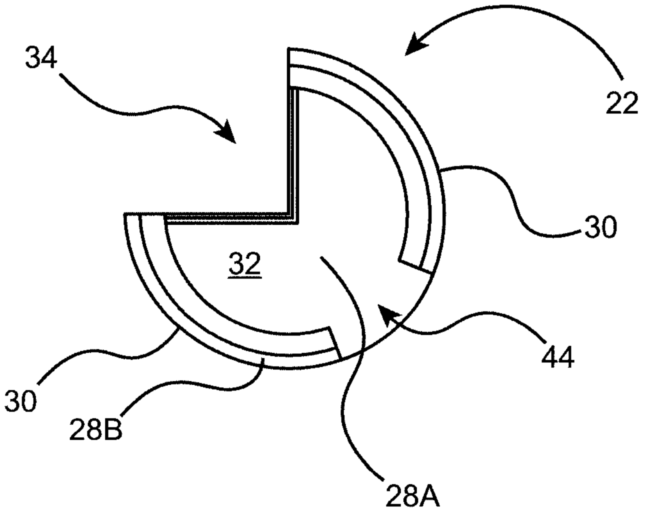
FIG. 7 is a top view of the first component of the connector rotated slightly relative to FIG. 6.
Figure 8:
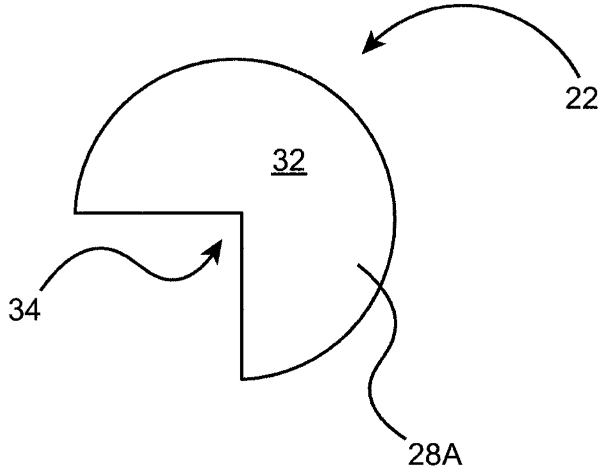
FIG. 8 is a bottom view of the first component of the connector rotated slightly relative to FIG. 7.
Figure 9:
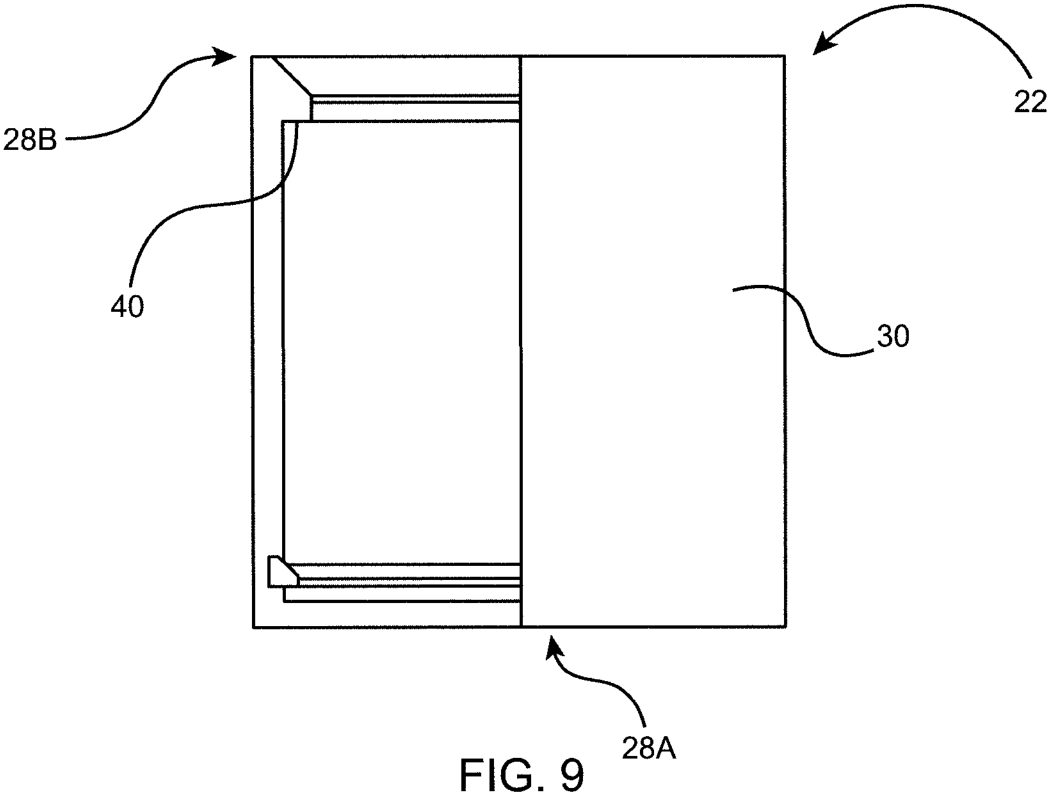
FIG. 9 is a front view of the first component of the connector showing the first longitudinal opening on the left side.
Figure 10:
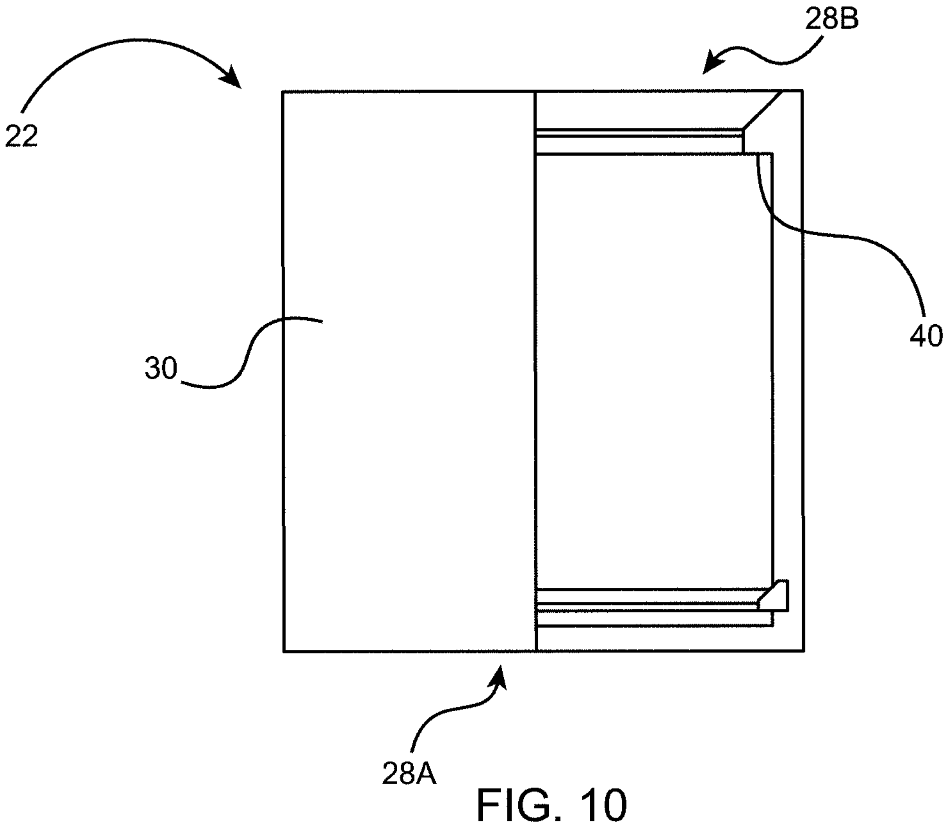
FIG. 10 is a side view of the first component of the connector showing the first longitudinal opening on the right side.
Figure 11:
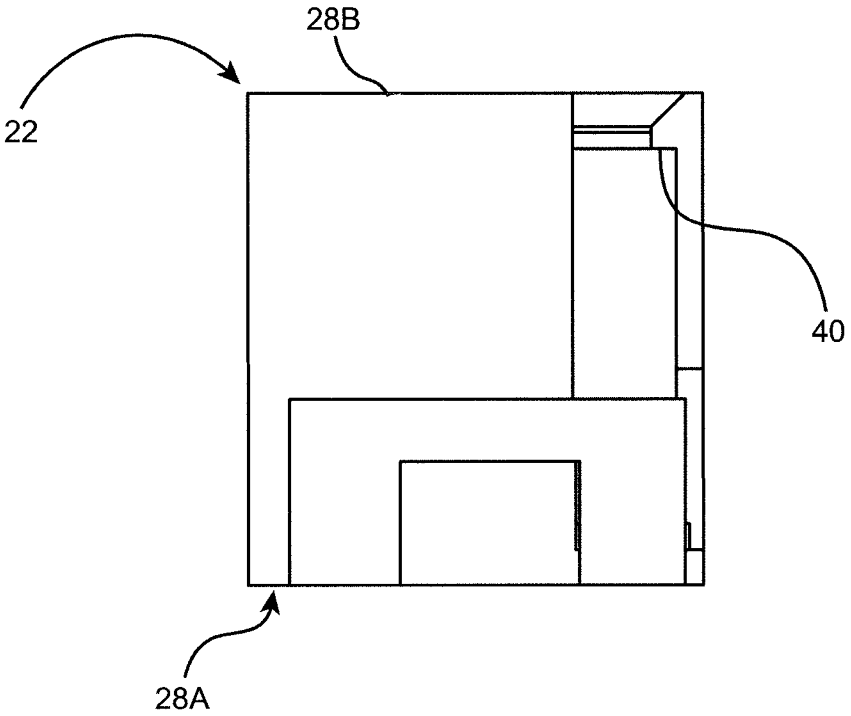
FIG. 11 is a side view of the first component of the connector similar to FIG. 10 showing the second component of the connector in front of the same.
Figure 12:
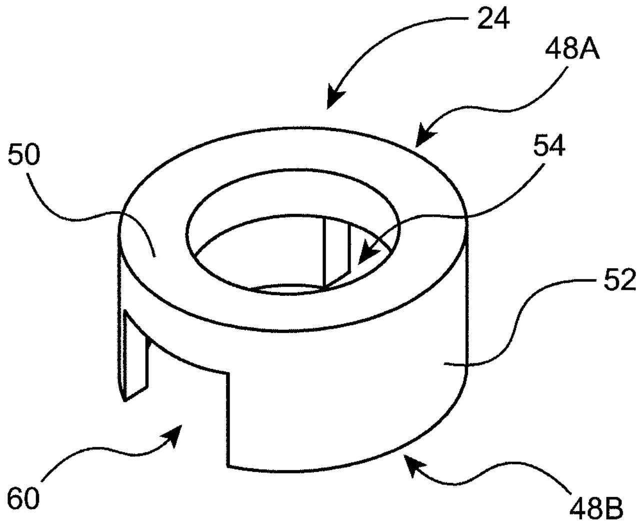
FIG. 12 is a top perspective view of the second component of the connector.
Figure 13:
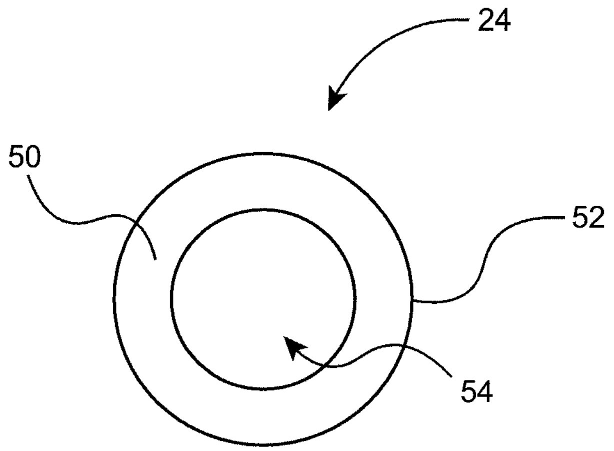
FIG. 13 is a top view of the second component of the connector.
Figure 14:
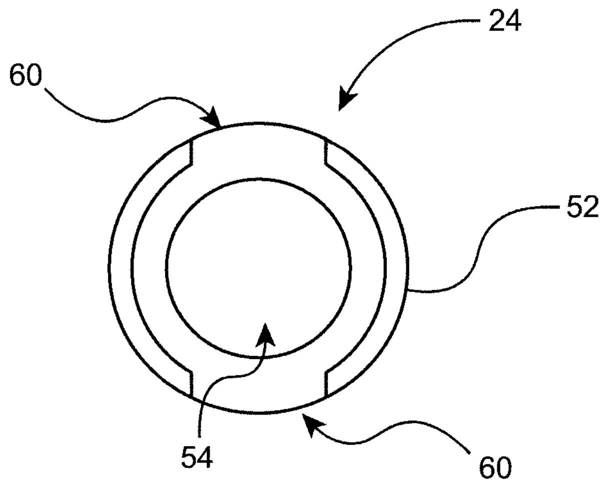
FIG. 14 is a bottom view of the second component of the connector.
Figure 15:
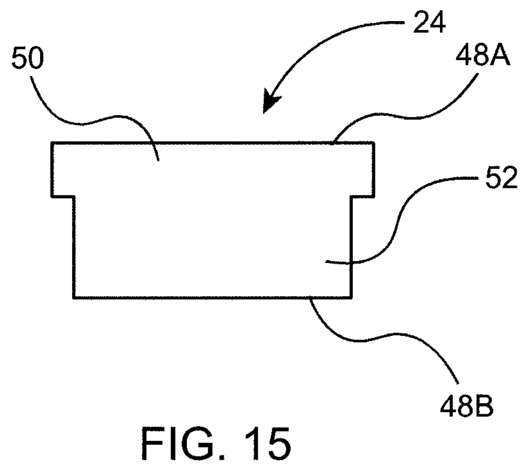
FIG. 15 is a front view of the second component of the connector.
Figure 16:
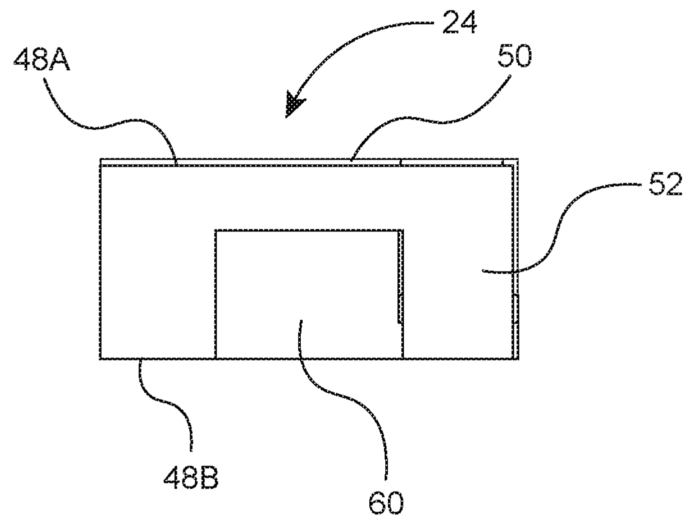
FIG. 16 is a side view of the second component of the connector.

The first (or "outer") component 22 has a longitudinal axis L, a first end 28A, a second end 28B, a length, and side walls 30 extending between the first end 28A and the second end 28B. The side walls 30 have an inside surface 30A and an outside surface 30B. The first end 28A of the first component 22 comprises an end wall 32 that has an opening 34 therein for accommodating the gas mask drinking water tube 36 shown in FIGS. 4 and 5. The second end 28B of the first component 22 is at least partially open, and the inside surface 30A of the side wall 30 has a shelf 40 thereon (shown in FIG. 6) adjacent the second end 28B. The shelf 40 provides a surface for engaging one end of the second component 24. The underside of the shelf 40 may have a beveled edge that is widest near the top of the shelf that narrows to provide a wider opening at the second end 28B of the first component 22.

The first component 22 can be of any size and configuration that is suitable for fitting around the gas mask fit test adapter 10. FIGS. 7-11 show additional views of the first component 22. In the embodiment shown, the first component 22 has a partially cylindrical configuration. While the opening 34 in the end wall 32 of the first component 22 can be of any suitable configuration, in this embodiment the opening 34 is in the shape of a sector of a circle. The first component 22 is described as having a partially cylindrical configuration since its side walls 30 have a pair of opposing longitudinally-oriented openings therein so that the first component 22 does not form a complete cylinder. The openings comprise a first longitudinally-oriented opening 42 (FIG. 6) that is aligned with the opening 34 in the end wall 32 of the first component 22 and a second longitudinally-oriented opening 44 opposite the first longitudinally-oriented opening 42. The longitudinally-oriented openings 42 and 44 may extend substantially the entire length of the first component 22 from the underside of the end wall 32 to the second end 28B of the first component 22. The longitudinally-oriented openings 42 and 44 provide openings for the wider portion 16 of the fit test adapter 10 that defines the waist of the gas mask fit test adapter 10.

The second (or "inner") component 24 is sized and configured for fitting into the second end 28B of the first component 22. The second component 24 has a first (or "inner" or "top") end 48A, a second (or "outer" or "bottom") end 48B, a top surface 50 at the top end 48A and shorter side walls (or "legs") 52 extending between the top end 48A and the bottom end 48B. The shorter side walls 52 terminate at the bottom end 48B and are sized and configured for resting on the shelf 40 adjacent the second end 28B of the first component 22.

It should be understood that the terms "first" and "second" are used herein only to distinguish one element, component, or portion thereof from another, and do not necessarily imply a sequence or order unless clearly indicated by the context. The terms "top" and "bottom", "left", and "right" used herein are only made in conjunction with the drawing figures, and the connector and the components thereof may be oriented differently in use.

The second component 24 can be of any size and configuration that is suitable for fitting inside the second end 28B of the first component 22 and for holding the connector 20 in place around the gas mask fit test adapter 10. FIGS. 11-16 show additional views of the second component 24. In the embodiment shown, the second component 24 has a partially cylindrical configuration that is shorter than the partially cylindrical first component 22. The top surface 50 of the second component 24 is ring-shaped having a central opening 54 therein. The shorter side walls 52 of the second component 24 also have a pair of opposing longitudinally-oriented openings 60 therein so that the second component 24 does not form a complete cylinder. The longitudinally-oriented openings 60 may extend substantially the entire length of the second component 24 from the underside of the top surface 50 to the bottom end 48B of the second component 24.

The components of the connector 20 can be made out of any suitable material(s) and by any suitable process. Typically, the components of the connector 20 will be made of plastic. The components of the connector 20 can be made by processes such as injection molding or 3D printing.

A method of temporarily fastening a drinking tube to one end of a fit test adapter for a gas mask is also provided in which the fit test adapter has a drinking tube end for attaching a drinking tube of a gas mask, an opposing end for inserting another tube, and a wider portion that defines a waist between the drinking tube end and the opposing end. The method may comprise the steps of:

a) attaching a drinking tube to the drinking tube end of the fit test adapter for a gas mask, wherein the drinking tube has a cap portion that fits onto the drinking tube end of the fit test adapter;
b) providing a connector as described above comprising a first component and a second component;
c) placing the first component over the cap portion of the drinking tube that is attached to the fit test adapter so that the end wall of the first component fits against the cap portion of the drinking tube and the drinking tube extends outward from the opening in the end wall, and the second end of the first component extends toward the opposing end of the fit test adapter; and
d) placing the second component over the opposing end of the fit test adapter and inserting the top end of the second component into the second end of the first component until the ends of the legs of the second component rest on the shelf on the inside surface of the first component.

In some cases, one or more of the steps described above may be optional. The steps described above may be performed in any suitable order.

The connector 20 described herein can provide a number of advantages. It should be understood, however, that these advantages need not be required unless they are set forth in the appended claims. The connector is used to seal the connection between the current gas mask drinking water tube and the fit test adapter in order to reduce or prevent negative fit tests. The connector does not interfere with the fit test since it does not modify any part of the fit test instrumentation.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A connector comprising:

a first outer component having a longitudinal axis, a first end, a second end, a length and side walls extending between said first end and said second end, said side walls having an inside surface and an outside surface and a pair of opposing longitudinally-oriented openings therein, wherein:
  the first end of the first component comprises an end wall that has an opening therein, and
  the second end of the first component is at least partially open, and the inside surface of the side walls has a shelf thereon adjacent the second end; and
a second inner component sized and configured for fitting into the second end of the first component, said second component having a top end, a bottom end, and comprising a top surface with a central opening therein, and side walls extending between said top end and said bottom end that are shorter in length than the side walls of the first component, said second component side walls having an inside surface and an outside surface, wherein the second component side walls terminate at said bottom end and are sized and configured for resting on the shelf adjacent the second end of the first component.

2. The connector of claim 1 wherein the opening in the end wall of the first component is in the shape of a sector of a circle.

3. The connector of claim 1 wherein one of the longitudinally-oriented openings is aligned with the opening in the end wall of the first component.

4. The connector of claim 1 wherein the shelf adjacent the second end of the first component has a beveled edge that is widest near the top of the shelf that narrows to provide a wider opening at the second end of the first component.

5. A method of temporarily fastening a drinking tube to one end of a fit test adapter for a gas mask, which fit test adapter has a drinking tube end for attaching a drinking tube of a gas mask, an opposing end for inserting another tube, and a wider portion that defines a waist between the drinking tube end and the opposing end, said method comprising the steps of:

a) attaching a drinking tube to the drinking tube end of the fit test adapter for a gas mask, wherein the drinking tube has a cap portion that fits onto the drinking tube end of the fit test adapter;
b) providing a connector comprising:
  a first component that is configured for fitting around a portion of the fit test adapter at the drinking tube end of the fit test adapter, said first component having a first end, a second end, and side walls extending between said first end and said second end, wherein the first end of the first component comprises an end wall that has an opening therein, and the inside surface of the side wall has a shelf thereon adjacent the second end; and
  a second component that is configured for fitting into the second end of the first component, said second component having a top end, a bottom end, and comprising a top surface with a central opening therein, and side walls that are shorter in length than the side walls of the first component extending between said top end to ends at said bottom end;
c) placing the first component over the cap portion of the drinking tube that is attached to the fit test adapter so that the end wall of the first component fits against the cap portion of the drinking tube and the drinking tube extends outward from the opening in the end wall, and the second end of the first component extends toward the opposing end of the fit test adapter; and d) placing the second component over the opposing end of the fit test adapter and inserting the top end of the second component into the second end of the first component until the ends of the side walls of the second component rest on the shelf on the inside surface of the first component.

* * * * *